United States Patent [19]

Barrett

[11] Patent Number: 4,544,021
[45] Date of Patent: Oct. 1, 1985

[54] METHOD AND APPARATUS FOR EXTRACTING HEAT FROM A NATURAL WATER SOURCE

[76] Inventor: George M. Barrett, R.R. #5, Galt, Ontario, Canada, N1R 5S6

[21] Appl. No.: 904,453

[22] Filed: May 9, 1978

[51] Int. Cl.$^4$ .............................................. F28D 1/04
[52] U.S. Cl. ....................................... 165/45; 62/260; 62/270
[58] Field of Search ...................... 62/324 D, 268, 260, 62/270; 237/2 B; 166/302, 314, 57; 60/641.2, 641.5; 165/45

[56] References Cited

U.S. PATENT DOCUMENTS

| | | | |
|---|---|---|---|
| 2,006,985 | 7/1935 | Claude et al. | 60/641 X |
| 2,165,854 | 7/1939 | Headrick | 165/45 |
| 2,438,720 | 3/1948 | Smith | 165/45 |
| 2,471,559 | 5/1949 | Dolezal | 62/268 X |
| 2,637,531 | 5/1953 | Davidson | 165/45 |
| 3,140,986 | 7/1964 | Hubbard | 60/641 X |
| 3,342,135 | 9/1967 | Schnabel, Jr. | 417/38 |
| 3,757,516 | 9/1973 | McCabe | 165/45 X |
| 4,448,237 | 5/1984 | Riley | 165/45 X |

OTHER PUBLICATIONS

"Nature's Teakettle", by HyDee Small, published by Geothermal Information Services, Feb. 1973.
Mechanical Engineers Handbook, Sixth Edition, (1958) pp. 9-99 to 9-101.

*Primary Examiner*—Michael Koczo
*Attorney, Agent, or Firm*—Charles E. Brown

[57] ABSTRACT

This relates to a heating system which may be utilized conventionally for the heating of homes or the like. The heating system incorporates a conventional well having a casing extending above the level of the water in the wall and wherein a sufficient vacuum is drawn in the casing above the water level so as to cause the water to boil at approximately the temperature of the water in the well. The pressure of the water vapor is then raised in the vacuum pump to a pressure substantially atmospheric or slightly above, at which time the water vapor temperature rises to approximately 212° F. The high temperature water vapor is then directed through a condenser where it is condensed back into water and is returned to the well or some other area. The condenser may be utilized for the transfer of heat to heat the house or other unit being heated.

4 Claims, 1 Drawing Figure

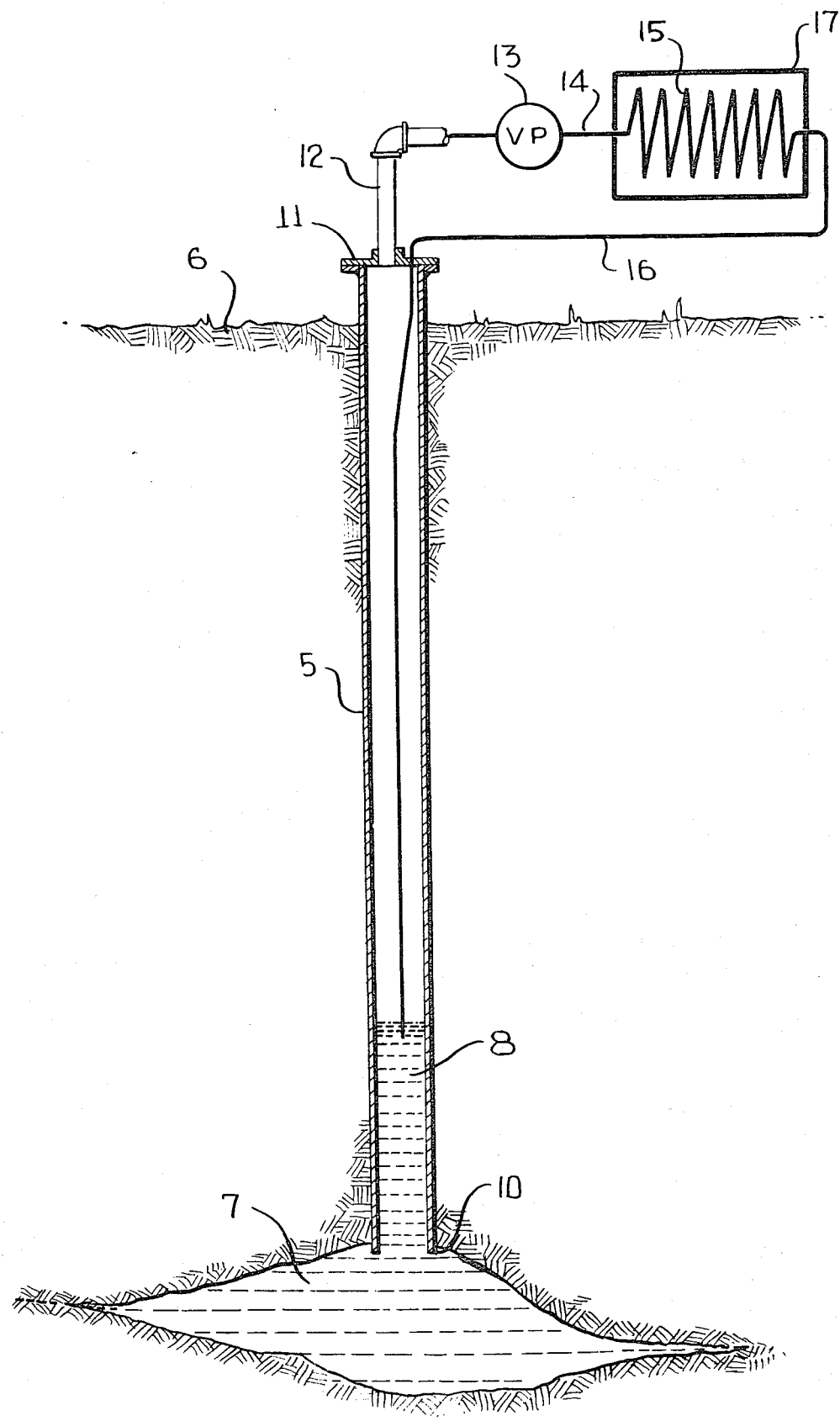

METHOD AND APPARATUS FOR EXTRACTING HEAT FROM A NATURAL WATER SOURCE

This invention realtes in general to new and useful improvements in heating systems, and more particularly to a heating system which utilizes the latent heat energy of water from a well.

It is known that water boils at different temperatures under different pressure conditions. It will be appreciated that well water which may have a temperature on the order of 50°–60° F. will boil at a pressure on the order of −10 to −13 p.s.i.g.

In accordance with this invention it is proposed to utilize a well having a casing which extends not only a fair distance below the level of the water, but also above the water a distance on the order of 22–25 feet. Attached to the upper end of the casing is a vacuum pump capable of reducing the pressure within the casing above the normal level of the water to one wherein the water at its normal temperature will boil. As the water is transformed into water vapor, it will, of course, absorb heat from the adjacent water and this heat is utilized in the heating system of this invention.

The water vapor is drawn through the vacuum pump where the pressure thereof is raised to atmospheric or slightly higher pressure with the temperature of the water vapor rising to approximately 212° F. or above. This heated water vapor (steam) is then directed into a condenser where it is condensed to its liquid form and returned to the well.

Inasmuch as substantially all of the heat energy is derived from the water in the well, the energy required to transform the well into vapor and circulate the vapor is minimal as to the heat which may be derived.

With the above and other objects in view that will hereinafter appear, the nature of the invention will be more clearly understood by reference to the following detailed description, the appended claims, and the view illustrated in the accompanying drawing.

The drawing is a schematic elevational view with parts in section showing the general arrangement of the heating system which is the subject of this invention.

Referring now to the drawing in detail, it will be seen that there is provided a conventional well which includes a casing 5 which is passed down into the earth 6 a sufficient distance to intercept a water bearing strata 7 so that water 8 may normally be disposed within the casing 5 at a level above the bottom 10 of the casing. This is true in an ordinary well and the normal height of water 8 within the casing 5 may be on the order of 10 feet or more.

In accordance with this invention it is necessary that the casing 5 extend up above the normal water level a distance on the order of 22–25 feet for a reason to be discussed in detail hereinafter. The casing 5 is capped as at 11 and has attached thereto a line 12 which leads to a conventional vacuum pump 13. The vacuum pump 13 should be one which is capable of handling water droplets and should have sufficient capacity so as to reduce the pressure in the casing 5 above the water 8 to a pressure on the order of −10 p.s.i.g. to −13 p.s.i.g. The vacuum pump 13 should also have a discharge pressure at or slightly above atmospheric pressure. A discharge line 14 connects the vacuum pump 13 to a condenser 15. The condenser 15 has a return line 16 which extends down into the well casing 5 and discharges condensed water back into the water 8 at least several inches below the level of the water. At this time it is pointed out that if there are other uses for the condensed water the line 16 may be connected to that other use facility.

It is to be understood that the vacuum drawn in the casing 5 above the water 8 has a tendency to draw the water up into the casing 5 well above the normal level of the water, and thus it is necessary that the head of the casing 5 above the normal water level be on the order of the aforementioned 22-25 feet so as to permit a vacuum to exist in the casing above the water level under all operating conditions.

It will be apparent that when the pressure within the casing 5 above the water 8 is sufficiently reduced the water at its temperature within the well will vaporize, drawing energy from the surrounding water to effect this vaporization. The water vapor will be drawn up into the vacuum pump and when its pressure is increased to atmospheric pressure or slightly above, the water vapor will not change state, but will increase in temperature to a temperature on the order of 212° F. and thus be supplied to the condenser 15 as steam.

It is pointed out here that when the system is first started up the water will have a tendency to condense in the pressure portion of the vacuum pump 13 until the temperature of the vacuum pump has reached 212° F. or slightly above, after which condensation will be limited to the condenser 15.

It will be apparent that the water in the upper part of the well will have its temperature constantly reduced and as a result the water within the casing 5 will constantly thermosiphon with the cold water flowing downwardly and the warmer water flowing to the top so as to replace the heat energy lost by the absorption of heat in the water at the extreme top of the water within the casing as it becomes vapor.

Inasmuch as the surrounding water provides the necessary energy for the vaporization of the water at the low pressure, little work is required to obtain the necessary heat. On the other hand, the energy of latent heat within the water vapor may be readily absorbed within the condenser 15 by the surrounding fluid so that an effective transfer of heat may be obtained.

It is pointed out here that if the heating system is utilized in heating a conventional house, the condenser 15 may be incorporated in a plenum 17 in the same manner as a refrigeration coil to effect heating of the house with hot air being blown over the condenser coils. On the other hand, it is to be understood that in a like manner water may be circulated over the condenser coils if a hot water heating system is desired.

While the invention is particularly applicable to a well, it is to be understood that any large volume source of water, such as a river, pond or lake, will equally as well suffice.

Although only a single preferred embodiment of the invention has been specifically illustrated and described herein, it is to be understood that minor variations may be made in the heating system without departing from the spirit and scope of the invention as defined in the appended claims.

I claim:

1. A heating system comprising a well casing having a lower end and an upper end portion, said lower end being coupled to a natural water source, a vacuum pump having an intake and a discharge, first conduit means connecting said well casing upper end portion to said vacuum pump in sealed relation, a condenser coil, and second conduit means connecting said vacuum pump discharge to said condenser coil for passage therethrough, said well casing having a head of water therein, and wherein said well casing has a height above the normal level of water in said well casing in excess of vacuum pull of said vacuum pump wherein a space remains in said well casing for the forming of water vapor in said casing.

2. The heating system of claim 1 wherein the head in the casing above water level is on the order of 22 to 25 feet.

3. A method of extracting heat from water comprising the steps of positioning a casing in a water source with a lower end thereof having a head of water therein, forming the casing of a length to have an upper end spaced above the normal level of water in the casing effected by said water source per se, coupling a vacuum pump to the upper end of the casing and drawing in the casing a vacuum sufficient to effect vaporization of water in said casing, pumping the water vapor out of said casing and raising the temperature and pressure thererof utilizing the vacuum pump, and directing the water vapor through a condenser coil and removing heat energy from said water vapor.

4. The method of claim 3 wherein the upper end of the casing is spaced above the normal level of water in the casing a distance on the order of 22 to 25 feet.

* * * * *